United States Patent [19]
Salakari

[11] 3,889,735
[45] June 17, 1975

[54] VEHICLE-TIRE STUD WITH RELATIVELY MOVABLE PARTS
[76] Inventor: Martti Salakari, 21500 Piikkio, Finland
[22] Filed: Nov. 27, 1973
[21] Appl. No.: 419,347

[30] Foreign Application Priority Data
Nov. 28, 1972 Finland............................. 3354/72

[52] U.S. Cl. ................. 152/210; 152/169; 152/208
[51] Int. Cl. ............................................. B60c 11/00
[58] Field of Search ........................... 152/208–212, 152/169

[56] References Cited
UNITED STATES PATENTS
1,046,969 12/1912 Chaloner ........................... 152/210
1,271,686 7/1918 Erdelyi................................. 152/210
3,098,516 7/1963 Vasiljevic........................... 152/210
3,516,466 6/1970 Smit.................................... 152/208

Primary Examiner—Drayton E. Hoffman
Attorney, Agent, or Firm—Ernest G. Montague; Karl F. Ross; Herbert Dubno

[57] ABSTRACT

Vehicle-tire stud comprises a wear-resistant central plug is movably received in an axially compressible stem. The stem includes a head part and a base-part, and these parts are movable relative to each other. The head part follows the movement of the wearing-surface rubber of the tire when said surface rubber is loaded and the central plug is wear-resistant.

5 Claims, 11 Drawing Figures

A.

B.

FIG. II.
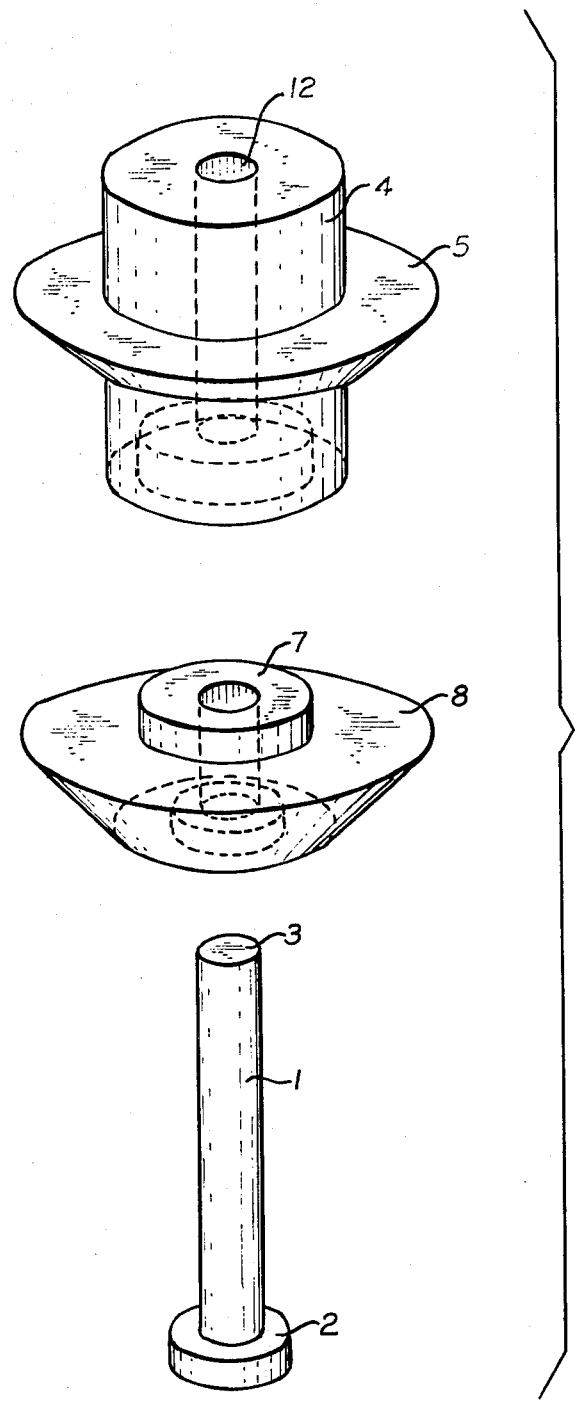

VEHICLE-TIRE STUD WITH RELATIVELY MOVABLE PARTS

The present invention relates to a vehicle-tire stud.

STRUCTURES OF THE PRIOR ART

Previous studs have been provided with a stem-part with one or more outstanding flanges, which attach the stud to the rubber of a tire, to this stem-part is fixed a wear resistant central shank or head by soldering, pressing, glueing, casting or any other method. Thus the force, which is brought to bear on this head also, forces the stem to sink into the rubber. This demands considerable force, for instance 20 to 40 kg. with a stud having a diameter of 2.7 mm at the head.

Considerably less force is developed in such structures, where the stem is made of one part and the central-shank or head-part is able to move inside the stem.

THE INVENTION

Even in the last-mentioned case, friction is created when the rubber is compressed by being squeezed against the ground. A stem part which is composed of only one member resists this compression of the rubber. A rubbing movement develops as rubber is moves relative to the head of the stem. This negative phenomenon has not been taken in consideration previously when planning studs.

It is one object of the present invention to provide a stud in which wherein the totally new and favorable solution is based on the fact, the outermost or head part is manufactured in such a way that it is able to move freely and specifically along with the rubber, in relation to the base or attaching part or flange. Into both of these, namely the head and the flange, has been mounted a central shank, which is free to move, and which has a stem and a base flange. A device, operating along with the compression of the wearing surface of the rubber, is also formed in an embodiment, wherein the stem is made of a spring. The system thus comprises a central member or pin (forming the head) and a sleeve member whose ends are compressible toward one another and surrounding the central member. The latter is composed of wear-resistant material and may project beyond the wearing surface of the tire, while the outer end of the sleeve member always remains flush with this surface, even on compression of the tire.

Another new and favorable influence of this structure is, that when the tire and simultaneously the stud is loaded against the ground, the ability of the central shank to thrust out of the stem is increased. In case the central shank engages a soft, for instance, a snow surface, the projection of the central shank is more than the projection of the central shank in an unloaded tire. The corresponding phenomenon, that is the increased projection of the central shank is also shown.

Thus this structure has a double effect:

a. The base of the central plug is causing an exerting force, which can be adjusted by the diameter of the base, and what is essential, which force is not at all influenced by the stem. In normal studs occur harmfully large forces, which are due to the fact, that the central plug has to weigh down the stem-part too.

b. Due to the fact that the directing-part of the stem is weighed down, the projection of the central plug is increasing, a gap LLCC . . . LLB exceeds the yielding movement of the central plug.

Among others, one important consequence is that despite the fact that one can use smaller exerting forces of the central plug, one still gets large enough projections of the central plug, which are necessary especially when driving on a soft, for instance snow-covered drive-way. Another result is also that the head doesn't cause unnecessary strain and thus wearing of the pavement.

With this and other objects in view, which will become apparent in the following detailed description, the present invention, which is shown by example only, will be clearly understood in connection with the accompanying drawings, in which:

FIG. 11 is an exploded, perspective view of a stud, designed in accordance with the present invention.

Figure 1:
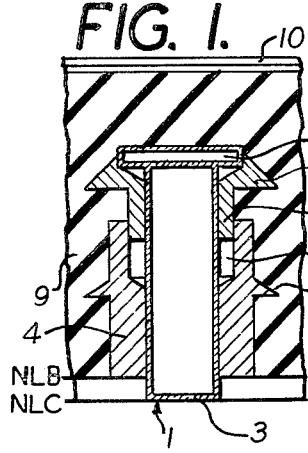
FIGS. 1 to 3 are axial sections of the studs in accordance with a first embodiment of the present invention.

Referring now to the drawings, the stud comprises a central plug or stem 1 having a base 2, 2–10 or 2–11 and a head-part 3. The directing part of the stem or head-part 4 has a flange 5, which in turn has an oblique inner surface. Due to the oblique inner surface of the flange, the head part 4 is pushed free from the base-or attaching part 7, when the stud is mounted on the tire. Thus the free or recess space 6 is formed with, among others, the result, that during the drive, when being pressed together, air is pressed out along the stem 1 removing dirt. The base-or attaching part 7 has a base-or attaching flange 8. When in FIG. 1 the part 9 of the wearing surface is compressed by the ground, the head part of the stem 4 can move accordingly. Thus no unnecessary strain causing wearing nor a too high temperature is developed.

Referring now to FIG. 11, there is a small and low (e.g. 0.20 . . . 0.25 mm) swelling 12 in the inner hole of the head-part, which presses against a central-shank and keeps the different parts of the stud together until it is fit into the tire, where the swelling is getting worn off swiftly.

Figure 2:
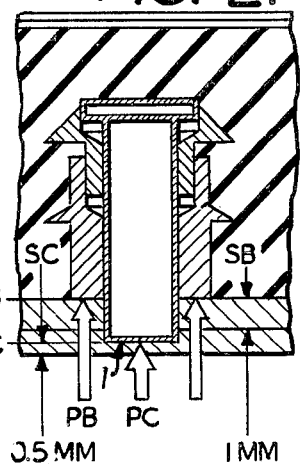
Figure 3:
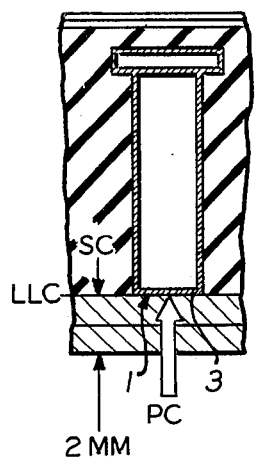
Figure 4:
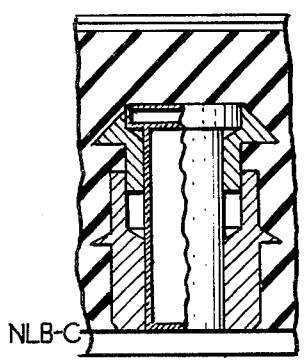
FIGS. 4 to 6 are axial sections of the studs in accordance with a second embodiment of the present invention.

FIGS. 1 to 6 show with the help of two sets two embodiments; The set A (FIGS. 1, 2 and 3), FIG. 1 shows an unburdened free state. The central plug 3 has a projection of about 1 mm (NLC to NLB). The set B (FIGS. 4, 5 and 6), FIG. 4 shows the head 3 of the central plug 3 unburdened in a free position at the level of the head of the directing-part 4' of the stem. The projection is zero.

The attached table explains the symbols used for indicating the levels of the different parts (e.g. NLB, LLC) and the sinkings (SB) and the forces (PB). The FIG. 5 and the table show the parts schematically and using average, illustrating comparative, Figures, because these differ from each other in different types of tires. Thus e.g. the rubber layers in the radial tires are thinner than in the woven tires. Thus the radial tire responds harder to the stud, and the manufacturing of a proper stud is a very demanding task, which by using this structure has been settled in an excellent durable way and at the same time reducing the wearing of the pavement.

A more detailed description of the two embodiments in Sets A and B is now presented:

Set A

FIG. 1: the wheel and the stud are unloaded. The head 3 has a projection in relation to the stem 4, in this case about 1 mm (see above).

FIG. 2: the loaded wheel and the stud are on a soft road-surface e.g. packed snow.

Sinking of the directing-part 4 of the stem is 1 mm, sinking of the stud SC about 0.5 mm, but the projection of the stud has grown by 0.5 mm too. Thus its projection is higher than in the original position (FIG. 1) and is now 0.5 mm. In this way an important effect has been achieved: the grip and the pulling ability of the stud have increased.

FIG. 3: the wheel is loaded on a hard drive-way e.g. asphalt. The sinking SC of the central plug 1,2 is 2 mm and its head 3 is at the level of the lower end of the directing-part.

Because the wheel has to carry the weight of the car in all cases, a force PB is brought to bear onto the stem too in FIGS. 2 and 3. Whereas the exerting force of the central plug 1 in FIG. 2 (on snow) is only about 2 to 3 kg and the sinking only 0.5 mm and in FIG. 3 on a hard surface (e.g. asphalt), the exerting force of the head 3 of the plug 1 against the surface is about 6 to 9 kg and the sinking SC 2 mm.

Set B

Figure 5:
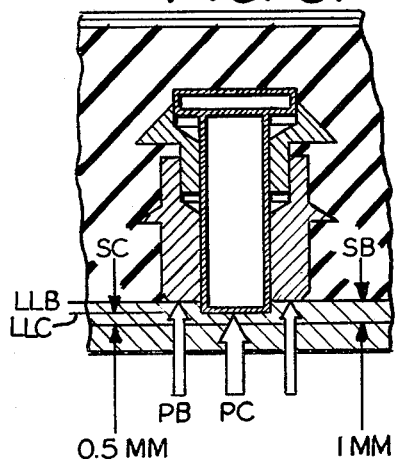
Figure 6:
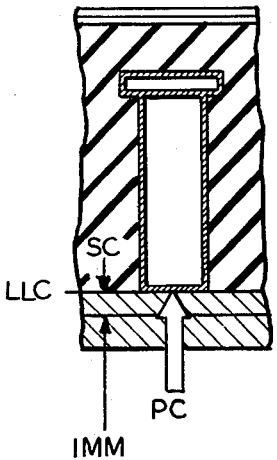
Figure 7:
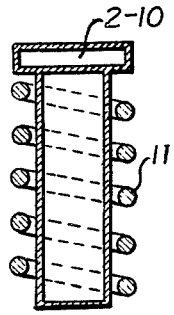
FIGS. 7 and 8 are additional embodiments of the studs.
Figure 8:
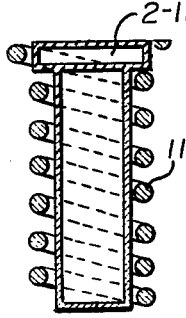

Corresponding phenomena and states are found in the cases presented in FIGS. 4, 5 and 6 of the set B. In the free position, the head 3 is on the same level with the directing part 4, that is the central plug is shorter than in FIG. 1. Details are presented in the table.

Figure 9:
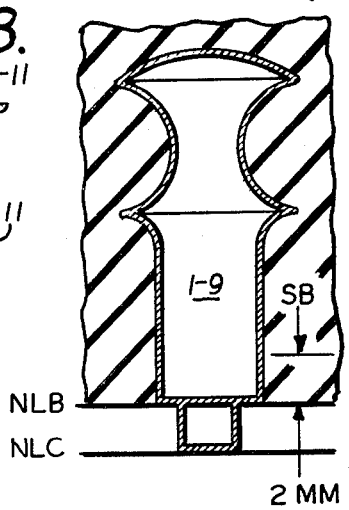
FIGS. 9 and 10 are axial sections of studs of the prior art.
Figure 10:
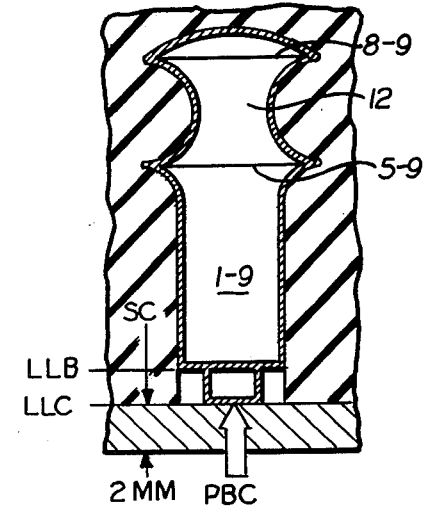

In order to be able to explain and compare the mechanical characteristics and effects of the structure of the invented stud and a normally used ordinary stud, FIGS. 9 and 10 provide the information. The drawing is enlarged about 4 times. In a free unloaded position, FIG. 9, the level of the head 1-9 is NLC. In a loaded position, FIG. 10, on a hard surface, the head should sink 2 mm and it must also push the stem (body) 2 mm into the rubber. This takes according to measurings made a very large force, line 8 in the table, column 10, which is depending on the type of the tire 20 to 40 kg. Compared to the stud in FIG. 1, the length of which in a private car and especially using radial tires is only 10 mm, is the length of the rigid stud in FIG. 9–15 mm. When thus the base of the stud 8-9 is close to the woven material, the sinking requires a great force. This causes a heavy wearing of the road surface. The force PBC, that is required, also depends on another essential factor: The base flange 8-9 of the stud is 8 mm and its surface is thus 50 mm². The sinking of the head of the stud 3 of the present invention is only opposed by the base flange 2 of the central plug 1. The diameter of this one is only 5 mm and the surface thus 19.5 mm². The ratio of these surfaces (50 and 19, 5) is bigger than 2, 5 and the required forces causing the sinking of the studs have a relativity with these surfaces. In addition the stud in FIG. 9 has a middle flange 5-9 which increases the required force additionally and thus the strain on the road surface is causing a heavier wearing.

Although the flanges of the stud 9 presumably are intended to prevent it from inclining, a rotating movement of inclination has been observed. Thus and because the diameter of the head of the body 1-9 is small, the stud doesn't sufficiently resist horizontal forces which are demanded in order to give a sufficient ability to pull. Due to the inclination the flanges 5-9 and 8-9 of the stud cut a ring-formed part at least partly loose from the rubber around the throat of the stud 12. Thus the force preventing the stud from inclining is reduced. During the drive a stooped stud doesn't effectively prevent slipping, it glides. When the wearing of the rubber increases the stud can even be detached completely. The situation is getting even worse because the wearing of the head is skew.

These disadvantages cannot be found using the structure with the movable central plug in a stem made of two parts. Several results are achieved: The friction between the directing part 4 and the rubber 9 of the wearing surface is considerably decreased.

This reduces the production of heat and the wearing of the rubber. The stud is held better in place and upright.

Due to the moveable central plug the strain on the road surfaces is considerably reduced.

When loaded (FIG. 2) a large projection of the head 3 is achieved (LLB to LLC). This increases the ability to hold the stud considerably. A cleaning blow of air from the middle space 6 is achieved.

While I have disclosed several embodiments of the present invention, it is to be understood that these embodiments are given by example only and not in a limiting sense.

I claim:

1. A stud for a vehicle-tire comprising:
   a wear-resistant central member;
   a pair of sleeve members surrounding said central member, said members being received in a tire, said sleeve members including an outer sleeve member flush with a wearing surface of the tire and an inner sleeve member embedded therein, said sleeve members being relatively displaceable with respect to each other and said central member being displaceable relative to said sleeve member and having a head adapted to project outwardly beyond said outer sleeve member, said inner sleeve member having a central hole receiving said central member and provided with a small and low swelling to hold said members together until said members are inserted in said tire.

2. A vehicle-tire stud comprising
   a central member and a sleeve member surrounding said central member and having an outer portion flush with a wearing surface of a tire and an inner portion lodged in said tire, said portions being relatively displaceable with respect to each other to follow the recession of said wearing surface, said central member being relatively displaceable with respect to the sleeve member and composed of a wear-resistant material having a head adapted to project beyond said outer portion upon depression of said tire.

3. The stud defined in claim 2 wherein said sleeve member is a helical spring.

4. The stud defined in claim 2 wherein said sleeve member comprises a pair of telescopically interfitting parts defining a compartment surrounding said central member between them and adapted to express air around said central member upon relative axial displacement of said parts, one of said parts forming said outer portion and the other of said parts forming said inner portion, each of said parts having an outwardly extending annular flange having an inwardly converging conical flank.

5. The stud defined in claim 4 wherein the part of said sleeve member forming said central portion is provided with an axial bore receiving said central member and formed with a swelling for temporarily engaging said central member to hold said members together until said stud is inserted in said tire.

* * * * *